United States Patent
Dins et al.

(10) Patent No.: US 9,898,875 B2
(45) Date of Patent: Feb. 20, 2018

(54) MAINTENANCE SYSTEMS AND METHODS FOR ECS ELEMENTS

(71) Applicant: HONEYWELL INTERNATIONAL INC., Morris Plains, NJ (US)

(72) Inventors: Artie Dins, Shanghai (CN); Dinkar Mylaraswamy, Fridley, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/202,681

(22) Filed: Jul. 6, 2016

(65) Prior Publication Data

US 2018/0012423 A1    Jan. 11, 2018

(51) Int. Cl.
| | |
|---|---|
| G07C 5/00 | (2006.01) |
| G06F 17/30 | (2006.01) |
| G06Q 10/00 | (2012.01) |
| B64D 13/06 | (2006.01) |
| G08G 5/00 | (2006.01) |

(52) U.S. Cl.
CPC ............ *G07C 5/006* (2013.01); *B64D 13/06* (2013.01); *G06F 17/30241* (2013.01); *G06Q 10/20* (2013.01); *G08G 5/003* (2013.01); *B64D 2013/0651* (2013.01)

(58) Field of Classification Search
CPC  G07C 5/006; B64D 13/06; B64D 2013/0651; G06F 17/30241; G06Q 10/20; G08G 5/003
See application file for complete search history.

(56) References Cited

U.S. PATENT DOCUMENTS

| | | | |
|---|---|---|---|
| 7,103,460 B1* | 9/2006 | Breed | B60C 23/0408 701/29.1 |
| 7,251,550 B2* | 7/2007 | Eschborn | G05B 23/0254 340/945 |
| 8,165,826 B2 | 4/2012 | Schimert et al. | |
| 8,478,479 B2* | 7/2013 | Ghelam | G05B 17/02 701/31.9 |
| 8,594,924 B2 | 11/2013 | King et al. | |
| 8,768,657 B2 | 7/2014 | Goldfine et al. | |
| 9,010,198 B2 | 4/2015 | Rajamani et al. | |

(Continued)

OTHER PUBLICATIONS

Claudia et al., Gather dynamic pollution data using mobile sensors, 2015, IEEE, p. P-9 to P-14.*

*Primary Examiner* — McDieunel Marc

(74) *Attorney, Agent, or Firm* — Lorenz & Kopf, LLP

(57) ABSTRACT

A maintenance system is provided for an environment conditioning element of an environmental control system (ECS) of a vehicle. The system includes a data collection module configured to receive geographical areas of travel for the vehicle over respective periods of time. The data collection module is configured to determine a pollution value and a time value for each of the geographic areas of travel. The system further includes a pollution count module coupled to the data collection module and receiving the pollution values and the time values. The pollution count module is configured to determine a pollution count for the environment conditioning element based on the pollution values and the time values. The system further includes a reporting module coupled to the pollution count module and receiving the pollution count. The reporting module is configured to generate a report for a user that includes the pollution count.

20 Claims, 5 Drawing Sheets

(56) References Cited

U.S. PATENT DOCUMENTS

| | | | |
|---|---|---|---|
| 2005/0192727 A1* | 9/2005 | Shostak | B60C 11/24 |
| | | | 701/37 |
| 2006/0212194 A1* | 9/2006 | Breed | G07C 5/008 |
| | | | 701/1 |
| 2007/0021950 A1 | 1/2007 | Mantel et al. | |
| 2007/0271014 A1* | 11/2007 | Breed | B60J 10/00 |
| | | | 701/31.9 |
| 2008/0086240 A1* | 4/2008 | Breed | G07C 5/008 |
| | | | 701/1 |
| 2009/0326890 A1 | 12/2009 | Shetty et al. | |
| 2010/0010708 A1 | 1/2010 | Bailly et al. | |
| 2014/0008035 A1 | 1/2014 | Patankar et al. | |
| 2014/0236415 A1 | 8/2014 | Foiret | |

* cited by examiner

MAINTENANCE SYSTEMS AND METHODS FOR ECS ELEMENTS

TECHNICAL FIELD

The present invention generally relates to aircraft maintenance systems and methods, and more particularly relates to aircraft maintenance systems and methods for the environment conditioning elements in environmental control systems (ECS).

BACKGROUND

Aircraft operate in various types of geographical areas, including areas with elevated levels of pollution. Pollutants may include dust, particulates, and other types of contaminants, and moreover, the level of pollution may be highly localized. As such, aircraft typically include an environmental control system (ECS) that functions to condition and filter the air and supply clean, pollution-free air to interior spaces, such as the main cabin area. Over time, pollutants accumulate in the elements of the ECS, and eventually, these elements must be serviced or replaced in a maintenance operation. However, accurately predicting the appropriate time for the maintenance operation and replacement of the elements may be challenging. Premature replacement of the elements may result in unnecessary downtime and cost, while delayed replacement of the elements may result in operational inefficiencies and passenger discomfort.

Accordingly, it is desirable to provide improved maintenance systems and methods that enable more timely and accurate replacement of ECS elements to minimize disruption and improve efficiency. Furthermore, other desirable features and characteristics of the present invention will become apparent from the subsequent detailed description of the invention and the appended claims, taken in conjunction with the accompanying drawings and this background of the invention.

Brief Summary

In accordance with an exemplary embodiment, a maintenance system is provided for an environment conditioning element of an environmental control system (ECS) of a vehicle. The system includes a data collection module configured to receive geographical areas of travel for the vehicle over respective periods of time. The data collection module is configured to determine a pollution value and a time value for each of the geographic areas of travel. The system further includes a pollution count module coupled to the data collection module and receiving the pollution values and the time values. The pollution count module is configured to determine a pollution count for the environment conditioning element based on the pollution values and the time values. The system further includes a reporting module coupled to the pollution count module and receiving the pollution count. The reporting module is configured to generate a report for a user that includes the pollution count.

In accordance with another exemplary embodiment, a maintenance system is provided for an environment conditioning element of an environmental control system (ECS) of a vehicle. The system includes a data collection module configured to receive a first geographical area of travel for the vehicle over a first period of time. The data collection module is configured to determine a first pollution value based on the first geographical area of travel and a first time value based on the first period of time. The system further includes a pollution count module coupled to the data collection module and receiving the first pollution value and the first time value. The pollution count module is configured to determine a first pollution count increment of a pollution count for the environmental conditioning element of the vehicle based on at least the first pollution value and the first time value. The system further includes a reporting module coupled to the pollution count module and receiving the pollution count. The reporting module is further configured to generate a report for a user that includes the pollution count.

In accordance with another exemplary embodiment, a method for evaluating a condition of an environment conditioning element of an environmental control system (ECS) of a vehicle. The method includes receiving a first geographical area of travel for the vehicle over a first period of time; determining a first pollution value based on the first geographical area of travel and a first time value based on the first period of time; generating a first pollution count increment based on the first pollution value and the first time value; determining a pollution count for the environmental conditioning element of the vehicle based on the first pollution count increment; and reporting the pollution count associated with the environmental conditioning element.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
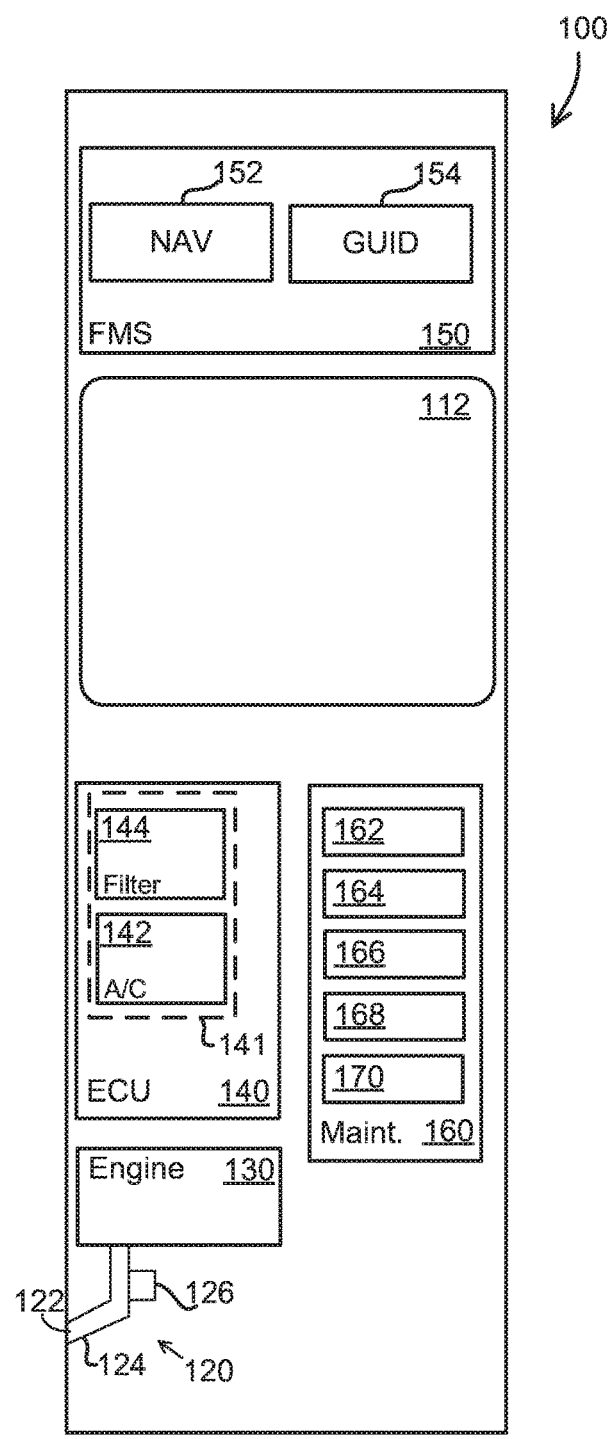
FIG. 1 is a schematic block diagram of an aircraft with an environmental control system in accordance with an exemplary embodiment.

FIG. 1 is a schematic block diagram of certain features of an aircraft (or aircraft system) 100 in accordance with an exemplary embodiment. Generally, the features of the aircraft 100 depicted in FIG. 1 may be relevant to the exemplary embodiments described below. Although not shown and/or discussed in detail, the aircraft 100 may have any number of additional components typically used in the aerospace industry. In the illustrated embodiment, the aircraft 100 includes a fuselage 110, an air intake apparatus 120, an engine 130, an environmental control system (ECS) 140, a flight management system (FMS) 150, and a maintenance system 160. Even though the description below primarily references "aircraft" for efficiency, the systems and methods are not limited to aircraft and can also be implemented in other types of vehicles, including cars, trucks, ships, submarines, spacecraft, or unmanned vehicles. The components of the aircraft 100 are introduced below prior to a more detailed description of the components and operation of the maintenance system 160.

Generally, the fuselage 110 is the main body of the aircraft 100 and may include or contain a cabin 112. As used herein, the term "cabin" refers to any interior space within the aircraft 100 that utilizes environmental control and houses passengers, crew, and/or electronic equipment. The aircraft 100 may further include an air intake apparatus 120 for directing air from the outer surface of the fuselage 110 to the engine 130, as described below. The air intake apparatus 120 may include a ram door 122 on the outer surface of the fuselage 110 and a duct assembly 124 that receives the air via the ram door 122 and directs the air to the engine 130. In one exemplary embodiment, the air intake apparatus 120 may include a sensor 126 that measures or otherwise derives any type of parameter associated with the air intake apparatus 120. For example, the sensor 126 may be a flow sensor that measures the flow rate of air into the air intake apparatus 120. Other types of arrangements for the fuselage 110 and/or the air intake apparatus 120 may be provided.

The engine 130 may include any type of system to provide energy to the aircraft 100 in the form of electricity and/or propulsion. In one exemplary embodiment, the engine 130 may be a turbofan or turboshaft engine, including a gas turbine engine. The engine 130 has an overall construction and operation that is generally understood by persons skilled in the art. As an example, the engine 130 may include a compressor section, a combustion section, a turbine section, and an exhaust section. The compressor section may include a series of compressors that raise the pressure of the air received from the air intake apparatus 120 and at least a portion of the compressed air is directed into the combustion section. In the combustion section, the high pressure air is mixed with fuel and combusted. The combusted air is then directed into the turbine section in which the combusted air expands through the rotor and stator assemblies and causes the rotor assemblies to rotate a main engine shaft for energy extraction. The air is then exhausted through the exhaust section.

Generally, the ECS 140 is configured to supply a relatively clean and conditioned flow of air (e.g., with the proper pressure, temperature, and humidity) to selected interior portions of the cabin 112. Moreover, the ECS 140 may direct a portion of the air from the engine overboard the aircraft 100. The ECS 140 receives a portion of the air from the engine 130, typically in the form of bleed air from the compressor section. In some embodiments, the ECS 140 may receive air directly from the air intake apparatus 120. The ECS 140 includes one or more environment conditioning elements 141. Generally, the environment conditioning elements 141 correspond to any portion of the ECS 140 that may be subject to air flow and/or that may be impacted by pollutants in the air flow. In the depicted embodiment, the environment conditioning elements 141 include one or more air conditioning units 142 and at least one filter element (or unit) 144. Although not shown, the environment conditioning elements 141 of the ECS 140 may include any number of control units, fans, ducts, plenums, valves, and the like for proper operation. Generally, the air conditioning units 142 includes one or more heat exchangers to cool or otherwise condition the flow of air in terms of pressure, temperature, and/or humidity. The air conditioning units 142 may be subject to air that is flowing through the units 142 to be directed into the cabin 112 and/or around the units 142 to be directed overboard the aircraft 100. In either event, the air conditioning units 142 may be impacted by pollutants in the air flow.

The filter element 144 functions to remove pollutants from the air flowing through the ECS 140, including dust, particulates, and/or contaminants. The filter element 144 (or elements) may be arranged in any location, including upstream of the air conditioning units 142, downstream of the air conditioning units 142, or within the air conditioning units 142. Typically, the filter element 144 is formed by some type of filtering material that absorbs or captures pollutants. The filtering material may be formed by fibrous paper materials, foam, cotton, steel, and the like. In some examples, the filter element 144 may further include materials such as activated carbon, silica gel, zeolites, etc. In a further example, the filter element 144 may additionally remove pollutants with a liquid and/or electric charge. Regardless of the type of filter element 144, over time, pollutants accumulate in the filter element 144. The pollutant accumulation may be referred to as "fouling." At some point, the filter element 144 must be replaced with a new filter element 144. In the description below, the level of pollutant accumulation or fouling is referred to as a pollution count, which functions as a condition indicator associated with the health or remaining life of the filter element 144. Although the embodiments and examples discussed below generally refer to the fouling and/or condition indicators of the filter element 144, such pollutant accumulation may also function as a condition indicator for other elements 141 of the ECS 140, including the air conditioning units 142, and embodiments discussed herein are generally applicable to those elements as well. Additional details about the pollution count and maintenance of the filter element 144 are provided below.

The FMS 150 generally performs a wide variety of in-flight tasks during operation of the aircraft 100, including navigation and guidance of the aircraft respectively implemented by the navigation system 152 and the guidance system 154. Although not specifically shown, the FMS 150, including the navigation system 152 and guidance system 154, may be implemented with one or more computer processors, such as for example, a microprocessor or digital signal processor capable of performing the functions discussed herein. The FMS 150 may further include a database with any elements necessary for the operation of the aircraft 100.

In general, the navigation system 152 determines the current kinematic state of the aircraft. As such, in the exemplary embodiment, the navigation system 152 includes any suitable position and direction determination devices, such as an inertial reference system (IRS), an air-data heading reference system (AHRS), radio navigation aids, or a global navigation satellite system (GNSS). For example, the navigation system 152 provides at least the current position and velocity of the aircraft to the guidance system 154. Other navigation information may include the current heading, current course, current track, altitude, pitch, and any desired flight information. In general, the guidance system 154 uses various flight and engine models and algorithms to construct lateral and vertical profiles for various segments that make up a flight plan based on navigation information received from the navigation system 152 (e.g., the current position and velocity) and inputs from the pilot or other source (e.g., the desired destination or fix). The guidance system 154 provides the flight plan in the form of guidance commands to the auto-pilot system (not shown) and/or the operator for implementation and appropriate operation of the aircraft 100.

Generally, the maintenance system 160 is used to monitor the condition or health characteristics of one or more aircraft systems and provides support for an operator or other individual for use in making decisions regarding future maintenance, operation, or use of the aircraft 100. The discussion below refers to an operator as any individual interacting with and/or receiving information from the maintenance system 160, including flight crew, maintenance crew, and control centers. In one exemplary embodiment, the maintenance system 160 particularly monitors the filter element 144 of the ECS 140, although the maintenance system 160 may also be integrated into a broader aircraft or fleet monitoring system that additionally monitors other aircraft systems or other aircraft. Generally, the maintenance system 160 receives data from various systems and subsystems of the aircraft 100. Based on this data, the maintenance system 160 determines, aggregates, and monitors a pollution count associated with the filter element 144. When the maintenance system 160 determines that the pollution count exceeds a predetermined threshold, the maintenance system 160 generates an advisory for the operator to service the filter element 144. Additional details about the function of the maintenance system 160 are provided below.

In one exemplary embodiment, the maintenance system 160 may be embodied as a computer system with a processor 162, a memory 164, an interface 166, and a storage device 168 coupled together in any suitable manner, such as a bus (not shown). Generally, processor 162 performs computation and control functions, and may be implemented with any type of processor or multiple processors, single integrated circuits such as a microprocessor, or any suitable number of integrated circuit devices and/or circuit boards working in cooperation to accomplish the functions described herein. During operation, the processor 162 executes one or more programs, typically stored within the memory 164 and, as such, controls the general operation of the maintenance system 160.

In one embodiment, the memory 164 stores a program or programs that execute one or more embodiments of a maintenance functions described in greater detail below. The memory 164 can be any type of suitable memory. The memory 164 may include one or more of various types of dynamic random access memory (DRAM) such as SDRAM, the various types of static RAM (SRAM), and the various types of non-volatile memory (PROM, EPROM, and flash). It should be understood that the memory 164 may be a single type of memory component, or it may be composed of many different types of memory components. In addition, the memory 164 and the processor 162 may be distributed across several different computers that collectively comprise the maintenance system 160.

The interface 166 allows communication to, from, and within the maintenance system 160 can be implemented using any suitable method and apparatus. The storage device 168 may be any suitable type of storage apparatus, including direct access storage devices such as hard disk drives, flash systems, floppy disk drives and optical disk drives. In one exemplary embodiment, the storage device 168 is a program product from which memory 164 can receive a program that executes one or more embodiments to perform the functions described herein. It will be appreciated that while this exemplary embodiment is described in the context of a fully functioning computer system, those skilled in the art will recognize that exemplary embodiments are capable of being distributed as a program product in a variety of forms, and that the present invention applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will similarly be appreciated that the maintenance system 160 may also otherwise differ from the embodiment depicted in FIG. 1.

The maintenance system 160 may additionally include a user interface 170 that enables the operator to interact with the maintenance system 160. As examples, the user interface 170 may present reports and/or advisories associated with the filter element 144 to the operator. As described in greater detail below, the user interface 170 may generate reports with various types of information associated with the ECS 140, including fleet level information and aircraft specific information. Additional information is provided below in reference to FIG. 4. The user interface 170 may include any suitable hardware and software components. Such components may include keyboards, mouse devices, buttons, switches, levers, and knobs. The user interface 170 may include a display unit capable of displaying various types of computer generated symbols and information, such as various CRT or flat panel display systems, such as LCDs, OLED displays, projection displays, plasma displays, HDDs, HUDs, and the like.

Notably, it should be understood that although maintenance system 160 appears in FIG. 1 to be arranged as an integrated system, the exemplary embodiments are not so limited and can also include an arrangement whereby one or more of the components are separate components or subcomponents of another system located either onboard or external to an aircraft. Additional details about the maintenance system 160 are provided below with reference to FIG. 2.

Figure 2:
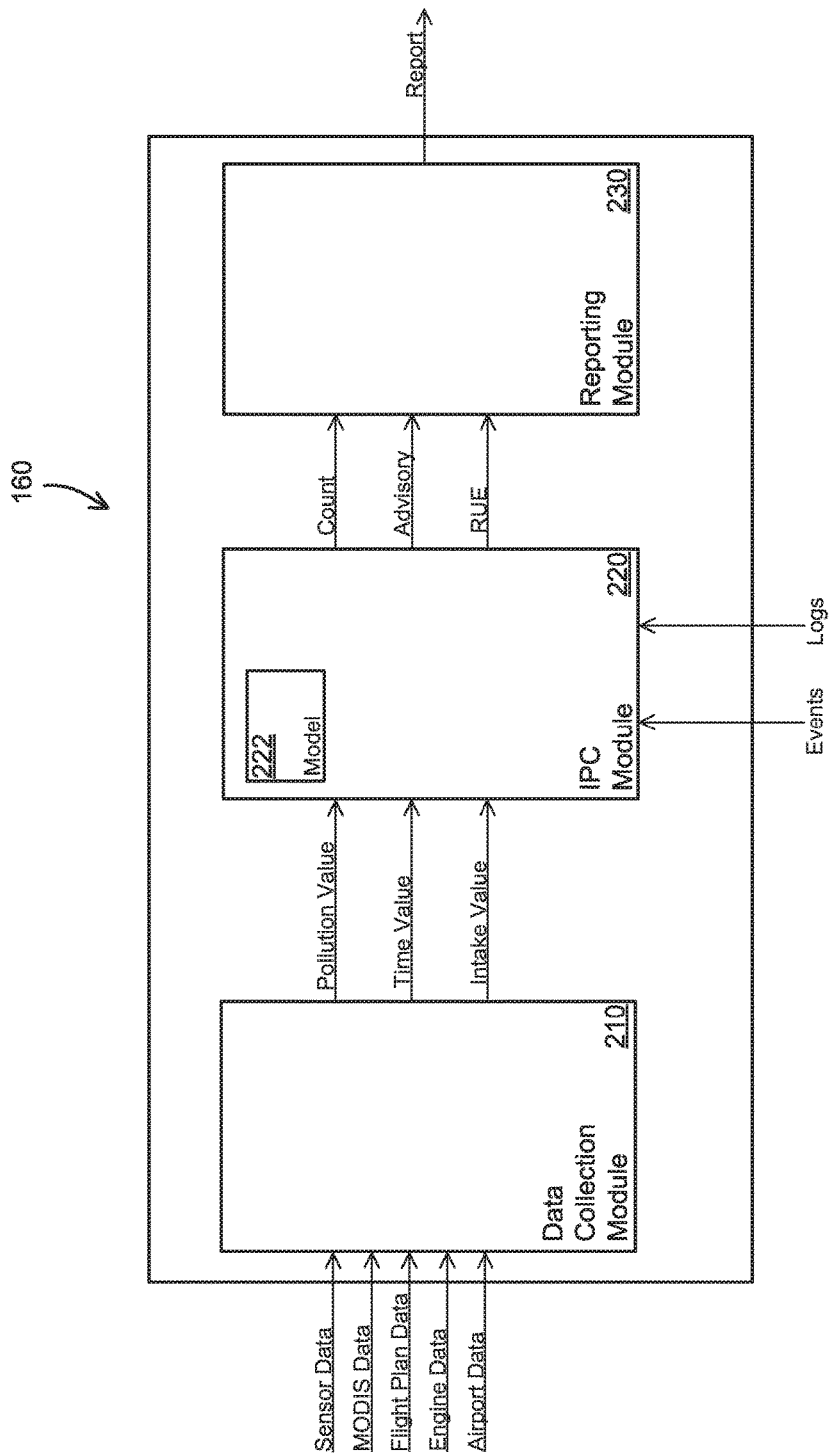
FIG. 2 is a schematic block diagram of a maintenance system for the environmental control system of FIG. 1 in accordance with an exemplary embodiment.

FIG. 2 is a more detailed functional block diagram of the maintenance system 160. FIG. 2 depicts the maintenance system 160 organized a number of functional units or modules 210, 220, and 230 (e.g., software, hardware, or combinations thereof). Specifically, each of the modules 210, 220, and 230 may be implemented by the components discussed above in FIG. 1 to carry out specific functions. FIG. 2 additionally depicts at least some of the data flows associated with the maintenance system 160. FIG. 2 depicts one exemplary organization, and other embodiments may perform similar functions with alternative organization or implementation. FIG. 2 is described below with additional reference to FIG. 1.

As noted above, the maintenance system 160 generally functions to evaluate the condition of the elements 141, particularly filter element 144 with respect to maintenance operations. In one exemplary embodiment, the maintenance system 160 calculates a pollution count, generates advisories when the pollution count suggests maintenance is needed, and generates reports with this information for the operator. The maintenance system 160 may perform these functions with a model 222 that generally represents the correlations or relationships between usage and fouling of one or more of the elements 141 to an extent that replacement is recommended. Generally, the maintenance system 160 may utilize any number of parameters to correlate usage with fouling, including pollution characteristics, geographical location, flight path characteristics, engine operating parameters, weather conditions, time dependencies, filter characteristics, historical maintenance data, and other data, as some examples. More specific examples of these parameters are discussed below.

As shown, the maintenance system 160 includes a data collection module 210. Generally, the data collection module 210 is configured to collect the data that may be relevant to operation of the maintenance system 160. The data collection module 210 may receive any relevant information, as referenced below. In the depicted embodiment, the data collection module 210 receives sensor data, pollution data, flight plan data, engine data, and airport data. In some embodiments, meteorological data may be provided. One or more of these data types may be omitted, and additional data types may be received. In some instances, the data may be received from other aircraft systems or instruments. In other instances, the data may be received via a communications unit, e.g., from command centers, airports, or other ground-based data sources. In further instances, the data may be preloaded onto the maintenance system 160 prior to flight and/or manually entered by an operator. Brief descriptions of the data types are provided below. As appropriate, the data collection module 210 may include any suitable type of conditioning and filtering functionality.

The sensor data generally refers to data received from an onboard sensor. As one example, the sensor data may be received from sensor 126 of the air intake apparatus 120. Such data may represent the flow rate of air admitted into the air intake apparatus 120 and/or the flow rate of air flowing through or around the elements 141.

The pollution data generally refers to data representing the nature of pollution in a particular area. As an example, the pollution data may be in the form of, or otherwise derived from, Moderate Resolution Imaging Spectroradiometer (MODIS) data maintained by NASA. For example, MODIS data includes aerosol data for a range of pollutants that may be relevant to the element 141 (e.g., that may result in fouling of the filter element 144). Typically, this data is generated by taking images of a respective geographical area and evaluating how surface reflectivity changes over time, thereby indicating amount of pollution in a particular area over time. Generally, MODIS data is available for the entire globe and localized pollution values may be derived for a particular geographic location. Regardless of source or derivation, the amount of localized pollution in an area of flight is referred to below as the pollution value.

The flight plan data generally refers to the schedule of geographic locations through which the aircraft has flown or will be flying. In one exemplary embodiment, the flight plan data may be used to determine the amount of exposure time that the aircraft spends in a particular geographical location with a corresponding pollution value. In one exemplary embodiment, the flight plan data is provided by the FMS 150.

The engine data generally refers to the engine data that is relevant to the fouling of the element 141. Such engine data may include, for example, representations of the engine duty cycles during operation. In one exemplary embodiment, the engine data may be used to determine that amount or rate of air flow through or around the element 141.

The airport data generally refers to localized pollution data in and around an airport. In one exemplary embodiment, the airport data may be used to determine a pollution value as an alternative to the MODIS data or in addition to the MODIS data. In one exemplary embodiment, the airport data is provided by the aircraft communication system (not shown) or preloaded into the maintenance system 160.

As described below, the maintenance system 160 may also receive other types of data, such as event data or maintenance log data, which are discussed in greater detail below. Although these data types are depicted as being received by the associated module 220, 230, such data may also be received by the data collection module 210 and provided to the appropriate module 220, 230.

In the depicted embodiment, the data received by the data collection module 210 is relatively raw data from which the data collection module 210 may generate one or more values. As shown in FIG. 2, the data collection module 210 generates and/or otherwise provides at least one of a pollution value, a time value, and an intake value to the integrated pollution count (IPC) module 220. As introduced above, the pollution value generally represents the amounts or magnitudes of pollution through which the aircraft 100 has traveled or will travel. The time value represents the amount of time that the aircraft 100 is exposed to a respective pollution value. In one embodiment, the time value corresponds to the amount of time that the aircraft spends below the boundary layer at a location. The intake value represents the rate of air that flows through or around the element 141. One or more of these values may be omitted. In some embodiments, the data collection module 210 may be integrated into the IPC module 220.

The IPC module 220 includes the model 222 formed by algorithms that provide a mathematical framework designed to process the received values to generate data-driven diagnostic and prognostic information associated with the element 141, e.g., the filter element 144 in this example. As introduced above, the model 222 generally represents the correlations or relationships between usage and fouling of the filter element 144, for example, based on empirical data. The model 222 may take various forms. In the depicted embodiment, the model 222 uses pollution, time and intake values derived from the input data to diagnose the condition of the filter element 144 over time and generate a prognosis for future use. In effect, the model 222 forms a composite predictor of filter or element health. As an example, the model 222 aggregates and integrates the ingested pollution amount over time to determine an integrated pollution count of an individual filter element 144, which may then be correlated to historical maintenance data to evaluate the condition of the filter element. As such, the model 222 enables condition and prognostic predictions based on real-world usage and actual ingested pollution. Additional information about one exemplary implementation of the model 222 is discussed below.

The IPC module 220 may further receive inputs associated with previous maintenance of the element 141, e.g., filter element 144 in this example. As shown in FIG. 2, the maintenance data may be in the form of event data and maintenance logs. Generally, event data corresponds to the data associated with replacement of the filter element 144. Since the replacement filter unit is a new filter element 144, the pollution count of the new filter unit is zero. In effect, replacing the filter element 144 with a new unit functions to "reset" the model 222. The maintenance logs may be used to form and/or adjust the model 222. For example, past maintenance activities on previous filter elements may be used to determine predictable relationships between exposure time values, pollution values, air intake values, and fouling to enable accurate estimations about the fouling of the filter element 144. In effect, these maintenance logs, particularly in combination with the other type of data discussed herein, enable the model 222 to use the input values to evaluate the condition of the filter element 144 and determine when the condition of the filter element 144 is such that replacement is required.

The IPC module 220 generates one or more outputs for the reporting module 230. In one exemplary embodiment, the IPC module 220 generates pollution count, remaining useful life (RUL), and advisory signals. Generally, as noted above, the pollution count represents to a magnitude of fouling of the element 141. In effect, the pollution count is a condition indicator for the element 141. The RUL represents the amount of pollution that the element 141 may additionally accumulate prior to requiring maintenance. The advisory represents an alert that the element 141 has a pollution count that is approaching or exceeds an acceptable level and needs to be serviced. In effect, the RUL and advisory represent prognostic indicators for the scheduling of maintenance.

The reporting module 230 receives the pollution count, RUL, and advisory signals and generates corresponding reports. For example, the reporting module 230 may generate a report upon receiving an advisory signal that requests a maintenance operation. Such reports may also be generated upon request by an operator, at predetermined time intervals, and/or upon the occurrence of an event, such as when a filter element 144 requires maintenance. The reports may be informational, e.g. that merely indicate the current pollution count or the present RUL of the filter element 144. In other embodiments, the reports may be automatically sent to a procurement center to schedule the appropriate maintenance operation.

Figure 3:
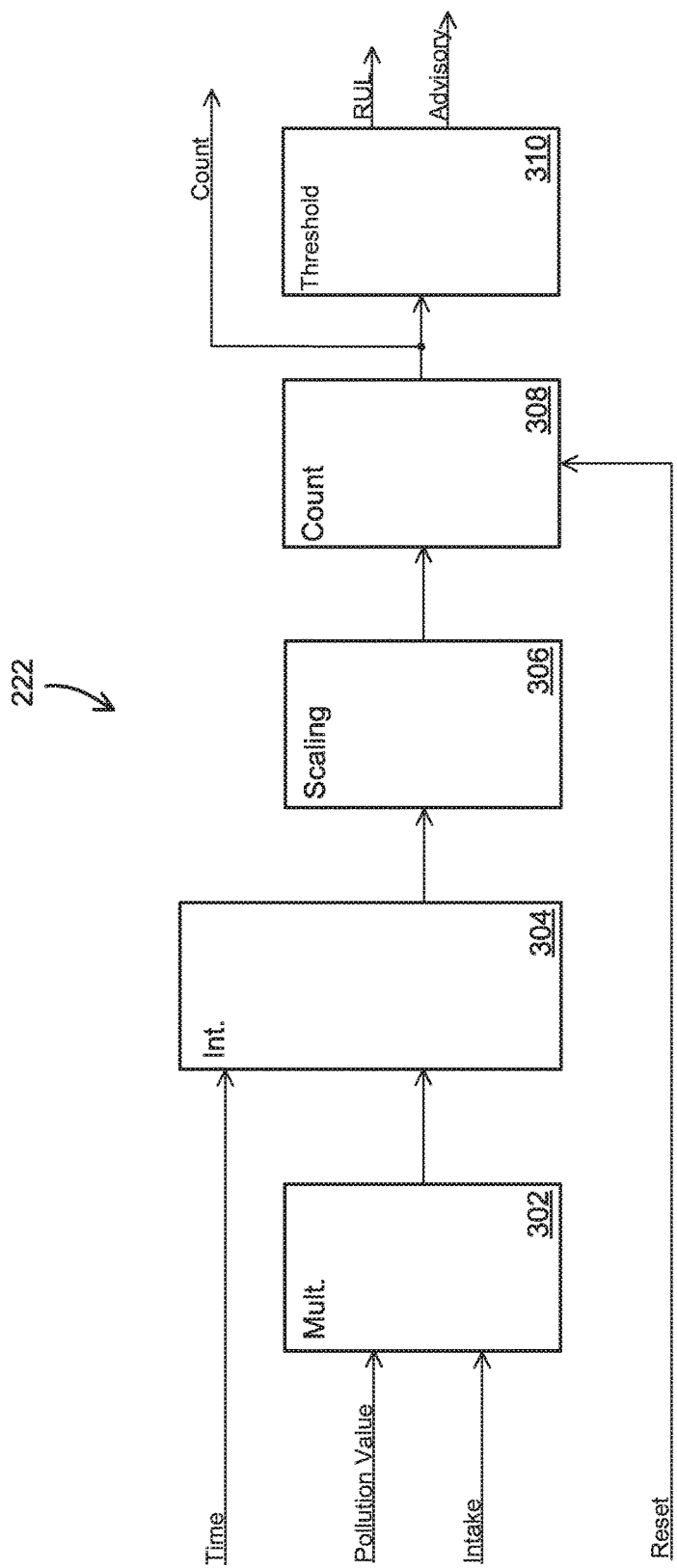
FIG. 3 is a functional block diagram of a model of the maintenance system of FIG. 2 in accordance with an exemplary embodiment.

FIG. 3 is a more detailed functional representation of the model 222 of the IPC module 220 that depicts one exemplary operational implementation. FIG. 3 depicts the model 222 represented by functional tasks or units that operate based on input parameters to generate outputs.

As shown in FIG. 3, the model 222 includes a multiplication unit 302 that receives the pollution value and the intake value as input parameters. The multiplication unit 302 multiplies the two values, and the resulting product is provided to an integration unit 304. The integration unit 304 additionally receives a time increment and integrates the product over the time increment to generate an integrated value. A scaling unit 306 functions to scale the integrated value, for example, by multiplying the integrated value by a constant. In some exemplary embodiments, the time increments are relatively small such that scaling constant is also relatively small. As an example, the scaling constant may be 1e-5 (or $10^{-5}$). The scaling unit 306 generates a pollution increment provided to a count unit 308. Accordingly, in one exemplary embodiment, the pollution increment may be expressed by the following mathematical expression:

$$IPC_{Increment} = c \times \int_0^T (\text{Pollution} \times \text{AirIntake}) dt$$

wherein $IPC_{Increment}$ is the pollution increment for a time period (t); c is a scaling constant; Pollution is the pollution value; and AirIntake is the air intake flow rate.

The count unit 308 aggregates or indexes the pollution increments to result in a pollution count. Accordingly, in one exemplary embodiment, the pollution count may be represented by the following mathematical expression:

$$IPC = \sum_{i=0}^T IPC_{Increment}$$

Initially, the pollution count is zero and grows over time as a result of additional pollution increments. The count unit 308 may also receive a reset input to reset the pollution count back to zero. As noted above, the reset input may be a result of replacing the particular element 141. The pollution count may be provided to a threshold unit 310.

Generally, the threshold unit 310 stores a threshold that represents a pollution count at which the respective element 141 should be replaced or at least scheduled for replacement. The threshold is generally based on historical data, such as the maintenance logs for similar units. The threshold may also be based on empirical data. In some embodiments, the model 222 may allow for dynamic and/or automatic modifications of the threshold based on, as examples, performance measurements or sensor data.

When the pollution count exceeds the threshold, the threshold unit 310 generates an advisory signal as an output. Otherwise, the threshold unit 310 does not generate the advisory signal. The advisory signal may be provided to the reporting module 230 to initiate an advisory report for the operator to service the respective element 141. The threshold unit 310 may also generate a signal representing the RUL of the respective element 141. In one exemplary embodiment, the RUL is the difference between the pollution count and the threshold. As such, the RUL represents the amount of pollution that the respective element 141 may additionally accumulate prior to requiring maintenance. In some exemplary embodiments, the RUL may be expressed as pollution value quantity, e.g., the value of the difference between the filter threshold and the present pollution count. In other exemplary embodiments, the RUL may be expressed as an estimate of time remaining, e.g., based on historical data or anticipated future usage. As noted above, these signals are provided to the reporting module 230 for communication to the operator.

In some instances, the model 222 may use assumptions to simplify the evaluation. For example, in one exemplary embodiment, the air intake flow rate may be treated as a constant. As such, any input corresponding to air intake flow rate may be eliminated and the resulting calculations may use an assumed rate for the time period. In a further embodiment, the time may be assumed for a given flight. For example, the time may be based on average times of exposure over a given flight. As noted above, the time corresponds to the time that the aircraft is exposed to the pollution. This exposure time is generally only applicable when the aircraft is taxiing on the ground prior to takeoff, when the aircraft is ascending from the ground to the boundary layer, when the aircraft is descending from the boundary layer, and when the aircraft is taxiing on the ground at the destination. Each of these values may be derived from historical averages. As examples, the exposure time ascending to the boundary layer may be approximately 250 seconds, and the exposure time descending from the boundary layer may be approximately 400 seconds. The taxiing time may be derived from push back, take-off, and on-block times. In one exemplary embodiment, the exposure time may be estimated at 14 minutes at the departure airport and at 17 minutes at the destination airport. As such, for a single flight, the model 222 may estimate the pollution count as the sum of the first pollution count over 14 minutes at the local pollution value of the departure airport and the second pollution count over 17 minutes at the local pollution value of the destination airport.

As described above, the maintenance system 160 (FIG. 2) may generate reports that represent the present and/or future condition of the ECS elements 141. An example of a report 400 that may be provided to the user is depicted in FIG. 5 on the user interface 170 (FIG. 1).

Figure 4:
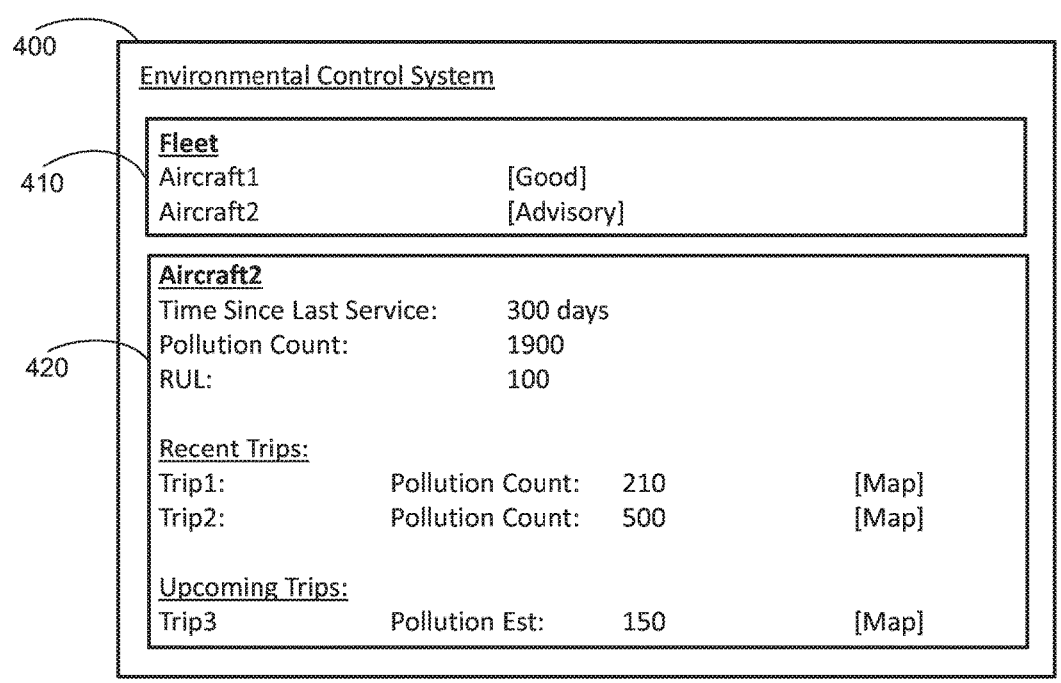
FIG. 4 is an example of a report generated by the maintenance system of FIG. 2 in accordance with an exemplary embodiment.

In the example of FIG. 4, the report 400 includes a fleet portion 410 and an aircraft section 450. Generally, the fleet portion 410 includes a list of one or more of the aircraft (e.g., "Aircraft1" and "Aircraft2") in the fleet and the present condition of the ECS or one or more of the ECS elements. In this example, the present condition is represented by a qualitative condition indicator, such as "Good" for Aircraft1 that indicates the ECS element is acceptable and "Advisory" for Aircraft2 that indicates the ECS element should be serviced or monitored. Any suitable type of fleet or aggregated information may be provided in the fleet portion 410, and in some embodiments, the fleet portion 410 may be omitted.

The aircraft section 450 provides more detailed ECS condition information about individual aircraft, such as an aircraft selected by the user from the fleet section 410. In the depicted example, the ECS condition information for Aircraft2 is provided in the aircraft section 450. In this example, the aircraft section 450 includes the time since last service, the present pollution count, and the present RUL. The aircraft section 450 further includes information associated with the most recent trips, such as the pollution count increment associated with the respective trip and map information that, upon selection, provides pollution conditions for each of the geographic areas for the respective trip. In this example, the aircraft section 450 further includes information associated with upcoming trips, such as an estimated pollution count increment associated with the respective upcoming trip. Any additional type of information may be provided, and one or more aspects of the depicted information may be omitted.

Figure 5:
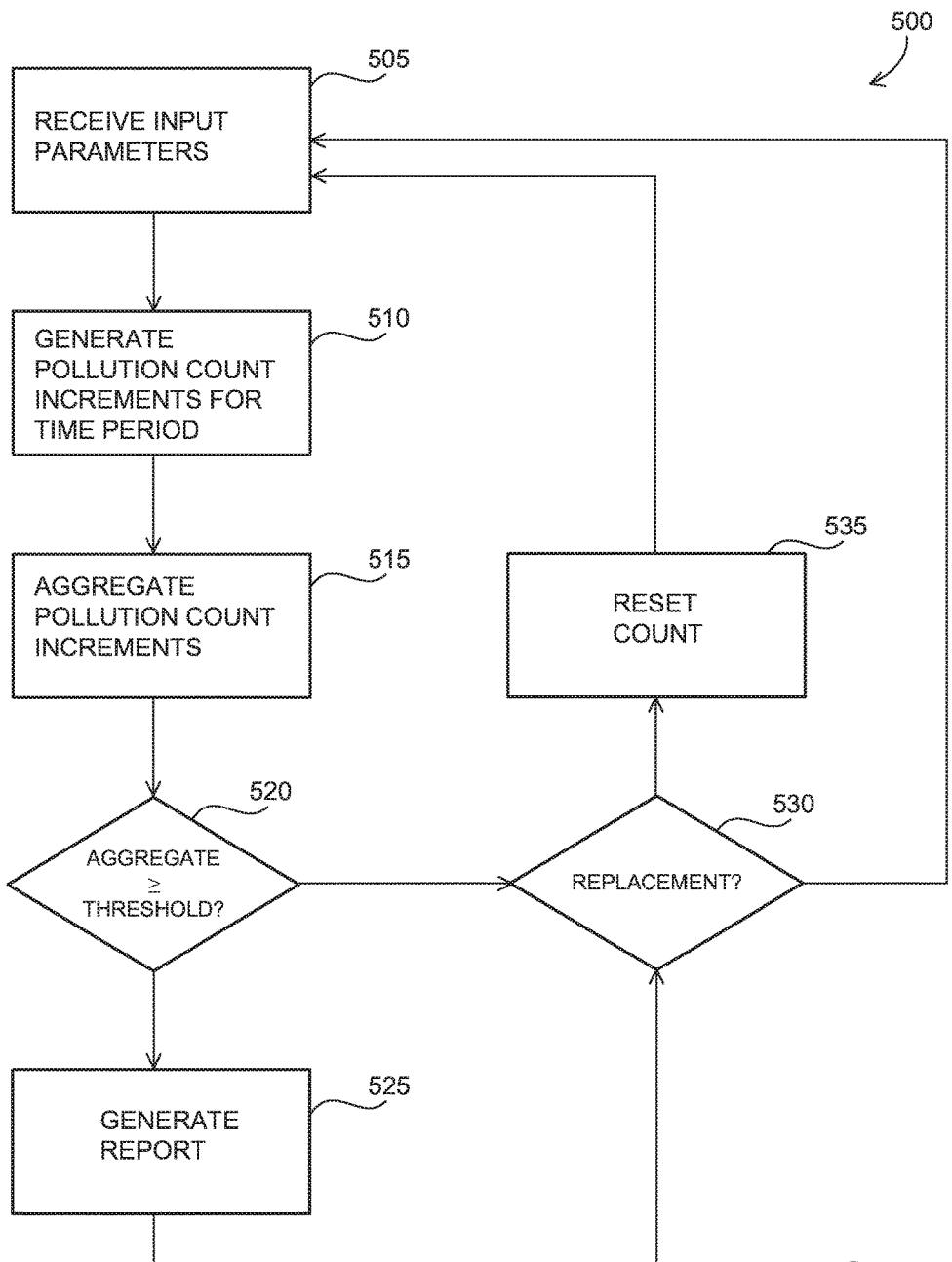
FIG. 5 is a flowchart of a method for evaluating the condition of a filter element in accordance with an exemplary embodiment.

FIG. 5 is a flowchart of a method 500 for evaluating the condition of a filter element, although as noted above, the method 500 is also applicable to any of the ECS elements 141. As an example, the method 400 may be implemented with the maintenance system 160 of FIGS. 2 and 3 on aircraft 100 of FIG. 1 with respect to a filter element 144. As such, FIGS. 1-3 will be referenced below. Although the various steps below are depicted as separate steps, at least some of the steps may be combined, rearranged, or omitted.

In a first step 505, the maintenance system 160 receives one or more input parameters, including parameters representing a pollution value and an air intake value over a time period of pollution exposure. In a step 510, the maintenance system 160 generates a pollution count increment based on the input parameters over the respective time period. In step 515, the maintenance system 160 aggregates the pollution count increments to result in a pollution count. In step 520, the maintenance system 160 evaluates the pollution count relative to a filter threshold. If the pollution count is less than the threshold, the method 500 proceeds to step 530. If the pollution count meets or exceeds the threshold, the method 500 proceeds to step 525 in which a report is generated. As noted above, the report may include an advisory or some other type of indication that the filter element requires replacement or maintenance. Subsequently, the method 500 proceeds to step 430 in which the maintenance system 160 determines if the filter element has been replaced. If the filter element has been replaced, the method 500 proceeds to step 535 in which the pollution count is reset. If the filter element has been replaced, the method 500 skips step 535. In any event, the method 500 returns to step 505 to repeat the method 500.

Accordingly, exemplary embodiments enable improved filter element monitoring and maintenance. This provides a maximized ECS filter life while minimizing unscheduled or unnecessary maintenance and delay costs. Exemplary embodiments estimate conditions such as fouling, RUL, and maintenance requirements based on correlations between the maintenance and real world usage. Exemplary embodiments provide these advantages without additional sensors or pollution mitigation equipment and without modeling heat exchanger physics. In some embodiments, customers may track fleet status and make recommendations about when to service the filter elements of ECS on any aircraft based on flight logs and external pollution data.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A maintenance system for an environment conditioning element of an environmental control system (ECS) of a vehicle, comprising:
   a data collection module configured to receive geographical areas of travel for the vehicle over respective periods of time, the data collection module configured to determine a pollution value and a time value for each of the geographic areas of travel;
   a pollution count module coupled to the data collection module and receiving the pollution values and the time values, the pollution count module configured to determine a pollution count for the environment conditioning element based on the pollution values and the time values; and
   a reporting module coupled to the pollution count module and receiving the pollution count, the reporting module configured to generate a report for a user that includes the pollution count.

2. The maintenance system of claim 1, wherein the pollution count module is configured to generate a pollution count increment for each of the pollution values and the time values and to generate the pollution count by aggregating the pollution count increments.

3. The maintenance system of claim 2, wherein the pollution count module is configured to generate the pollution count increments by integrating each of the pollution values over the respective time value.

4. The maintenance system of claim 3, wherein the data collection module is further configured to receive an air intake flow rate, and wherein the pollution count increment is calculated as follows:

$$IPC_{Increment} = c \times \int_0^T (\text{Pollution} \times \text{AirIntake}) \, dt$$

in which
$IPC_{Increment}$ is the pollution count increment for a time period (t);
c is a scaling constant;
Pollution is the pollution value; and
Airintake is the air intake flow rate.

5. The maintenance system of claim 1, wherein the pollution count module is configured to receive a service event signal indicating a servicing of the environment conditioning element, the pollution count module further configured to reset the pollution count upon receiving the service event signal.

6. The maintenance system of claim 1, wherein the pollution count module stores a pollution count threshold, and wherein the pollution count module is configured to compare the pollution count to the pollution count threshold and issue an advisory when the pollution count exceeds the pollution count threshold.

7. The maintenance system of claim 6, wherein the pollution count module is configured to estimate a remaining useful life of the environmental conditioning element based on the pollution count.

8. The maintenance system of claim 1, wherein the data collection module is configured to receive air intake data for the geographical areas of travel, the data collection module further configured to determine an air intake value for each of the geographic areas of travel, and
wherein the pollution count module is configured to determine the pollution count for the environment conditioning element additionally based on the air intake values.

9. The maintenance system of claim 1, wherein the pollution count module includes a model configured to generate a condition indicator for the environment conditioning element based on the pollution count.

10. The maintenance system of claim 9, wherein the model is based on maintenance records associated with the environmental conditioning element.

11. The maintenance system of claim 1, wherein the data collection module is configured to receive a flight plan for the vehicle and to determine the geographical areas of travel based on the flight plan.

12. The maintenance system of claim 1, wherein the data collection module is configured to receive airport data associated with the geographical areas of travel and to determine the pollution value based on the airport data.

13. The maintenance system of claim 1, wherein the data collection module is configured to receive Moderate Resolution Imaging Spectroradiometer (MODIS) data associated with the geographical areas of travel and to determine the pollution value based on the MODIS data.

14. The maintenance system of claim 1, wherein the vehicle is an aircraft, and wherein the time value corresponds to the amount of time that the aircraft spends below a boundary layer within the geographical areas of travel.

15. A maintenance system for an environment conditioning element of an environmental control system (ECS) of a vehicle, comprising:
a data collection module configured to receive a first geographical area of travel for the vehicle over a first period of time, the data collection module configured to determine a first pollution value based on the first geographical area of travel and a first time value based on the first period of time;
a pollution count module coupled to the data collection module and receiving the first pollution value and the first time value, the pollution count module configured to determine a first pollution count increment of a pollution count for the environmental conditioning element of the vehicle based on at least the first pollution value and the first time value; and
a reporting module coupled to the pollution count module and receiving the pollution count, the reporting module configured to generate a report for a user that includes the pollution count,
wherein the pollution count module is configured to generate the first pollution count increment by integrating the first pollution value over the first time value,
wherein the pollution count module stores a pollution count threshold, and wherein the pollution count module is configured to compare the pollution count to the pollution count threshold and issue an advisory when the pollution count exceeds the pollution count threshold, and
wherein the pollution count module is configured to estimate a remaining useful life of the environmental conditioning element based on the pollution count.

16. The maintenance system of claim 15, wherein, over a service life of the environment conditioning element, the data collection module is configured to receive additional geographical areas of travel for the vehicle over additional periods of time, and wherein the data collection module is configured to determine additional pollution values based on the additional geographical areas of travel and additional time values based on the additional periods of time, and
wherein the pollution count module is configured to determine additional pollution count increments based on the additional pollution values and the additional time values, the pollution count module generating the pollution count by aggregating a first pollution count increment and the additional pollution count increments.

17. The maintenance system of claim 15, wherein the data collection module is configured to determine a first air intake value corresponding to the first geographical area of travel for the vehicle over the first period of time, and wherein the pollution count module is further configured to determine the first pollution count increment additionally based on the first air intake value.

18. A method for evaluating a condition of an environment conditioning element of an environmental control system (ECS) of a vehicle, the method comprising:
receiving a first geographical area of travel for the vehicle over a first period of time;
determining a first pollution value based on the first geographical area of travel and a first time value based on the first period of time;
generating a first pollution count increment based on the first pollution value and the first time value;
determining a pollution count for the environmental conditioning element of the vehicle based on the first pollution count increment; and reporting the pollution count associated with the environmental conditioning element;

receiving a second geographical area of travel for the vehicle over a second period of time;

determining a second pollution value based on the second geographical area of travel and a second time value based on the second period of time;

generating a second pollution count increment based on the second pollution value and the second time value, wherein the determining the pollution count includes aggregating the first pollution count increment and the second pollution count increment; and generating a condition indicator of the environmental conditioning element based on the pollution count.

19. The method of claim 18, further comprising receiving a service event signal associated with the environmental conditioning element and resetting the pollution count based on the service event signal.

20. The method of claim 18, further comprising generating a prognostic indicator of the environmental conditioning element based on the pollution count.

* * * * *